United States Patent [19]

Wedel et al.

[11] 3,987,001

[45] Oct. 19, 1976

[54] ULTRAVIOLET PROTECTORANT COMPOSITION

[75] Inventors: Carroll J. Wedel; Frank L. Steckhahn, both of Walnut Creek; John David Gardner, Richmond, all of Calif.

[73] Assignee: Chevron Research Company, San Francisco, Calif.

[22] Filed: Feb. 3, 1975

[21] Appl. No.: 546,380

[52] U.S. Cl. .................. 260/32.8 R; 260/33.4 R; 260/33.3 UA; 260/45.95 F; 427/160; 427/421; 428/520
[51] Int. Cl.² ........................................ C08K 5/07
[58] Field of Search .......... 260/33.4 R, 33.6 F, 260/45.95 F, 89.5 A, 32.8 R, 33.8 UA; 252/305; 428/520; 427/160, 421

[56] References Cited

UNITED STATES PATENTS

| | | | |
|---|---|---|---|
| 2,853,521 | 9/1958 | Hardy | 260/45.95 F |
| 2,876,210 | 3/1959 | Wynn et al. | 260/45.95 F |
| 2,976,259 | 3/1961 | Hardy | 260/45.95 F |
| 3,193,540 | 7/1965 | Kutner | 260/89.5 A |
| 3,496,136 | 2/1970 | Suzi et al. | 260/45.95 F |
| 3,607,828 | 9/1971 | Hussey | 260/45.95 F |
| R24,414 | 1/1958 | Stetz et al. | 260/33.6 F |

*Primary Examiner*—J. Ziegler
*Attorney, Agent, or Firm*—George F. Magdeburger; Dix A. Newell; S. Russell LaPaglia

[57] ABSTRACT

An ultraviolet protectorant composition is provided for surface application by aerosol to polyolefins. The composition consists of an ultraviolet protectorant, a binder and solvent.

4 Claims, No Drawings

ULTRAVIOLET PROTECTORANT COMPOSITION

BACKGROUND OF THE INVENTION

This invention relates to an aerosol composition for the protection of polyolefins from light-induced degradation. When a polyolefin such as polypropylene is exposed to ultraviolet light for a period of time, particularly when exposed to sunlight, noticeable deterioration of the physical properties of the polymer is observed. On the theory that the polymer can be stabilized for a much longer period by preferential absorption of the radiation by another absorber, or by quenching of the absorbed radiation, various ultraviolet light stabilizers have been incorporated into the polypropylene composition. The disadvantages of this procedure include the imparting of color to the polyolefin by the ultraviolet stabilizer, limited compatibility of the ultraviolet stabilizer with the polyolefin and inefficient use of the stabilizer.

When a polyolefin is exposed to sunlight the greatest amount of deterioration occurs at the surface. For example, polypropylene moldings take on a dull cast due to surface crazing although the bulk of the molding retains its physical properties. Surface effects are also believed to predominate in the ultraviolet deterioration of polyolefin fibers, films, yarns, tapes, etc. Although it is the surface which requires protection from ultraviolet radiation, ultraviolet absorbers (stabilizers) are normally bulk-blended into the polyolefin. Only that portion of the stabilizer which is initially present near the surface or migrates to the surface from the bulk is believed to be effective in inhibiting the initiation of degradation. Consequently, a more effective use of an ultraviolet stabilizer would be to apply it directly to the surface where it is needed.

The surface protection of polymers by an ultraviolet stabilizer is described in U.S. Pat. No. 2,568,894. A composition of 2-hydroxy benzophenone and oxidized polymeric wax is disclosed in U.S. Pat. No. 3,429,841 for surface application to polypropylene. A problem in the prior art, leading to very limited use of surface application of stabilizers, is the difficulty of making the stabilizer adhere to the polypropylene and resist abrasion without producing a waxy or tacky surface which readily picks up dirt and soils. The solution to this problem is determinative of the usefulness of surface-applied protectorants to polyolefin textiles and carpets. The protectorant also must be compatible with the polyolefin and with the other materials found in combination with the polyolefin.

SUMMARY OF THE INVENTION

A composition which provides ultraviolet protection to polyolefins by surface application by aerosol consists of about 1–5 weight percent of an ultraviolet protectorant, about 0.5–5 weight percent of a binder, about 50–80 weight percent of solvent and an inert aerosol propellant. The composition is compatible with polyolefins and adheres to them without tackification. The ultraviolet protectorant comprises a 2-hydroxybenzophenone and a benzoate ester, the binder comprises poly($C_1$—$C_6$ alkyl) methacrylate and the solvent comprises methylene chloride, acetone, n-butylalcohol and cyclohexanone.

DETAILED DESCRIPTION OF THE PREFERRED EMBODIMENTS

The aerosol ultraviolet protectorant composition of this invention is applicable to the surface of any polyolefin article, including textile fabrics of all kinds, monofilaments, multifilaments, fibers, yarns, staple, felts, sheets, films molded articles, woven textile fabrics, knitted textile fabrics, extruded articles and blown articles. The composition finds particular usefulness in the protection of $C_2$—$C_6$ polyolefins, particularly polypropylene.

The ultraviolet protectorant 13 comprised of a hydroxy benzophenone and a benzoate ester. The preferred hydroxy benzophenones encompass halogen, nitro, hydroxyl and $C_1$—$C_{30}$ alkyl or alkyloxy-substituted 2-hydroxy benzophenones. Such compounds include 2,4-dihydroxy-benzophenone, 2,2'-dihydroxy-4,4'-dimethyloxy benzophenone, 2,2',4,4'-tetrahydroxy benzophenone, 2-hydroxy-4-methyloxy-benzophenone, 2-hydroxy-4-methyloxy-4'-methyl-benzophenone, 2,2'-dihydroxy-4-methyloxy-benzophenone, 2-hydroxy-4-n-heptyloxy-benzophenone, 2-hydroxy-4-n-octyloxy-benzo phenone, 2-hydroxy-4-methyloxy-2'-carboxybenzophenone, 4-dodecyloxy-2-hydroxy-benzophenone, 5-chloro-2-hydroxy-benzophenone, etc. The preferred benzoate esters encompass $C_8$—$C_{20}$ alkyl and aryl benzoates, alkyl and aryl hydroxybenzoates, alkaryl and aralkyl benzoates and alkaryl and aralkyl hydroxybenzoates such as resorcinol monobenzoate and alkylphenyl hydroxybenzoates. The benzoate ester finding use in the ultraviolet protectorant is preferably an alkylphenyl hydroxybenzoate wherein said alkyl is of from 1–10 carbon atoms, and most preferably 2,4-di-t-butylphenyl-3,5-di-t-butyl-4-hydroxybenzoate. Other ultraviolet stabilizers for poly-1-olefins of the ultraviolet absorbing type may also be incorporated into the ultraviolet protectorant in minor amounts, e.g., benzotriazoles and substituted acrylonitriles, as well as other ultraviolet stabilizers for poly-1-olefins of the absorber-precursor type, such as the phenyl salicylates, the phenyl benzoates and resorcinol monobenzoate.

The ultraviolet protectorant is normally present at about 1–5 weight percent of the total aerosol composition and normally comprises about 70–90 weight percent benzoate ester and about 30–10 weight percent hydroxy benzophenone. The degree of tackiness varies with the amount of hydroxy benzophenone in the aerosol, with larger amounts of hydroxy benzophenone producing an undesirable tackiness. It is preferred to use less than 1 weight percent hydroxy benzophenone based on the total aerosol composition.

The binder makes up about 0.5–5 weight percent of the aerosol composition and comprises a poly($C_1$—$C_6$ alkyl)methacrylate such as polymethylmethacrylate, polyethylmethacrylate, polypropylmethacrylate and polybutylmethacrylate, including methacrylate copolymers such as copolymers of methylmethacrylate and butylmethacrylate. One type of satisfactory polyalkyl methacrylates are those marketed by Rohm and Haas under the "Acryloid" trade name and which are normally provided as the solid resin or in solution with a suitable solvent. The polyalkylmethacrylates are described in Kirk-Othmer Encyclopedia of Chemical Technology, 2nd Ed., 1967, Interscience, New York, particularly in Vol. 13, beginning at p. 345. A preferred polymethylmethacrylate has a viscosity of 540–1625 cps (25° C) as 35% solids in methylethylketone. A preferred methylmethacrylate-butylmethacrylate copolymer has a viscosity of 210–345 cps (25° C) as 40% solids in toluol. A preferred binder composition which shows very reduced tendency to make polyvinylchloride materials tacky comprises, in addition to poly($C_1$—$C_6$ alkyl)methacrylate (about 30–65 weight percent), polyvinylchloride-acetate copolymer (0–35 weight percent). Preferably about 30 percent of the aforesaid polyvinyl copolymer together with a minor amount (about 4 weight percent) of cellulose acetate-butyrate is used in the binder.

Weight ratios of 1.5–0.5:1 of ultraviolet protectorant to binder are preferred because generally it is found that those aerosol compositions having roughly equal weight proportions of ultraviolet protectorant and binder produce the most favorable results. Such aerosol compositions exhibit a fullness of film, excellent gloss and clarity and dry to a tack-free film in approximately 8–10 minutes. Contrastingly poorer results are obtained from aerosol compositions containing ultraviolet protectorant in weight ratio to binder of 2:1 or more. Those compositions lack the former fullness of film, have poorer gloss and clarity, and exhibit some "blush" during the drying cycle. Blush is a whitish, powdery surface appearance, or dull surface appearance, which is highly undesirable.

The solvent makes up 50–80 weight percent of the aerosol composition. The solvent is preferably a mixture based on methylene chloride with substantial amounts of acetone and smaller amounts of n-butyl alcohol and cyclohexanone. Methylchloroform can also be substituted for at least some methylene chloride. A very minor amount of methyacrylate resin solvent such as methylethylketone (1–4 weight percent based on total solvent) may be present if the methacrylate resin is added as a solution in the resin solvent. The preferred solvent comprises about 20–60 weight percent methylene chloride, about 0–30 weight percent methylchloroform, about 20–40 weight percent acetone, about 5–10 weight percent n-butyl alcohol and about 10–20 weight percent cyclohexanone, wherein said weight percents are based on total solvent.

The aerosol composition contains an aerosol propellant which does not react with other components of the composition and is selected from among those known to the art as suitable for this use. Such aerosol propellants are selected on the basis of their vapor pressure characteristics and their compatibility with the solvent. They include low molecular weight hydrocarbons and chlorofluorocarbons such as those marketed by the duPont Company under the tradename Freon, e.g. dichlorodifluoromethane, trichloromonofluoromethane, etc.

A liquid concentrate of the ultraviolet protectorant composition is normally prepared for shipment prior to filling of the aerosol containers for marketing to the consumer. Such a liquid concentrate comprises a major amount by weight of solvent and minor amounts of the ultraviolet protectorant and binder. Normally, the liquid concentrate comprises 50–90 weight percent solvent, 5–25 weight percent ultraviolet protectorant and 5–25 weight percent binder.

The present invention is applicable to polyolefins, particularly to solid polypropylene, whether crystalline, or non-crystalline, or partially non-crystalline and partially crystalline. Following application of the composition to the polyolefin by aerosol, the polyolefin surface is allowed to dry by evaporation of the solvent. Application is preferably at temperatures of 60° F–90° F and drying proceeds normally at these temperatures. Among the benefits achieved by the present invention, in addition to ultraviolet protection, are full coverage of the polyolefin by the protecting film, film clarity, and lack of tackiness.

The protectorant of this invention is applicable to various types of polyolefin film, fiber, molded articles, etc. Fibers and other articles containing mixtures of various polymers, or copolymers, such as other polyolefins, polyvinyls, polyesters, nylons, or propylene-ethylene copolymers, in combination with the polyolefin can also benefit from the protection afforded by this composition. Additives such as dyes, pigments, plasticizers, lubricants, anti-oxidants and other UV stabilizers may be used in the production of the final polyolefin article protected by the aerosol of the present invention.

EXAMPLES

Example 1

An ultraviolet protectorant composition for surface application to a polyolefin as an aerosol was made by combining 1.6 weight percent based on total aerosol compositions of 2,4-di-t-butylphenyl-3,5-di-t-butyl-4-hydroxybenzoate, 0.4 weight percent of 2-hydroxy-4-n-octoxy-benzophenone, 2 weight percent of the copolymer of methylmethacrylate and butylmethacrylate, 35 weight percent of methylene chloride, 21 weight percent of acetone, 5 weight percent of n-butyl alcohol, 10 weight percent cyclohexanone, and 25 weight percent of inert aerosol propellant.

Example 2

An ultraviolet protectorant composition for surface application to a polyolefin as an aerosol was made by combining the ultraviolet protectorant of Example 1 with a binder consisting of 0.7 weight percent of polymethylmethacrylate, 1.22 weight percent of a partially hydrolyzed polyvinyl chloride-acetate copolymer, and 0.08 weight percent of cellulose acetate-butyrate. The solvent consisted of 21 weight percent of methylene chloride, 13.95 weight percent of methylchloroform, 20 weight percent acetone, 5 weight percent n-butyl alcohol, 10 weight percent cyclohexanone and 1.05 weight percent methylethylketone. The inert aerosol propellant again made up 25 weight percent of the composition.

The ultraviolet protectorant composition of Example 1 was field tested and the results are given in the table. The field tests were carried out at two locations on commercial chairs containing polypropylene webbing. Half of the chairs were treated in the field by aerosol spray with the composition of Example 1, and the other half, used as controls, were left untreated. After 3–4 months outdoor exposure, the treated materials and the untreated materials were evaluated as to tensile strength and percent extension of the polypropylene. The results show a definitely better extension and tensile retention for the treated polypropylene webbing.

TABLE

| Location of Test | Polypropylene Webbing in Commercial Chairs | Extension % | Tensile Strength Lbs. to Fail | % Improvement Over Untreated Extension | Tensile |
|---|---|---|---|---|---|
| Fresno, California | Untreated, Green | 47 | 700 | — | — |
| | Field Treated, Green | 58 | 910 | 23 | 30 |
| | Untreated, White | 24 | 605 | — | — |
| | Field Treated, White | 49 | 800 | 103 | 32 |
| Florida | Untreated, Green | 55 | 785 | — | — |
| | Field Treated, Green | 58 | 1025 | 5 | 31 |
| | Untreated, White | 18 | 475 | — | — |
| | Field Treated, White | 68 | 1105 | 280 | 133 |

What is claimed is:

1. A composition for application by aerosol to a polyolefin surface consists of about 1–5 weight percent of an ultraviolet protectorant comprising a 2-hydroxy benzophenone and a benzoate ester, about 0.5–5 weight percent of a binder comprising a poly($C_1$—$C_6$ alkyl)methacrylate, about 50–80 weight percent of solvent comprising methylene chloride, acetone, n-butyl alcohol and cyclohexanone, and an inert aerosol propellant.

2. A composition according to claim 1 wherein said benzoate ester is 2,4-di-t-butylphenyl-3,5-di-t-butyl-4-hydroxy benzoate and said 2-hydroxy benzophenone is 2-hydroxy-4-n-octoxy-benzophenone.

3. A composition according to claim 1 wherein said solvent comprises about 20–60 weight percent of methylene chloride, about 0–30 weight percent of methyl chloroform, about 20–40 weight percent of acetone, about 5–10 weight percent n-butyl alcohol and about 10–20 weight percent of cyclohexanone.

4. A composition according to claim 1 wherein said poly($C_1$—$C_6$ alkyl)methacrylate is a copolymer of methylmethacrylate and butylmethacrylate.

* * * * *